United States Patent [19]

Makaya

[11] 4,119,541
[45] Oct. 10, 1978

[54] ARRANGEMENT FOR DISPOSING OF FLUID FLOATING MATTER

[75] Inventor: Shigetoshi Makaya, Osaka, Japan

[73] Assignee: M.O. (Mitsui-Osaka Maritime Construction Company Limited), Osaka, Japan

[21] Appl. No.: 682,610

[22] Filed: May 3, 1976

[51] Int. Cl.² ............................................. E02B 15/04
[52] U.S. Cl. ........................ 210/242 R; 210/DIG. 25
[58] Field of Search ................. 210/83, 242, DIG. 25, 210/125, 143, 320, 84

[56] References Cited

U.S. PATENT DOCUMENTS

| | | | |
|---|---|---|---|
| 2,876,903 | 3/1959 | Lee | 210/242 S |
| 3,237,774 | 3/1966 | Schuback | 210/242 |
| 3,348,690 | 10/1967 | Cornelissen | 210/242 |
| 3,613,891 | 10/1971 | Cloutier | 210/242 |
| 3,642,140 | 2/1972 | Parker | 210/242 |
| 3,651,943 | 3/1972 | Di Perna | 210/DIG. 25 |
| 3,656,619 | 4/1972 | Ryan | 210/242 |
| 3,661,263 | 5/1972 | Peterson | 210/242 |
| 3,684,095 | 8/1972 | Ayers | 210/242 X |
| 3,690,464 | 9/1972 | Heinicke | 210/DIG. 25 |
| 3,708,070 | 1/1973 | Bell | 210/242 |
| 3,730,119 | 5/1973 | Budris | 210/242 |
| 3,731,802 | 5/1973 | James | 210/84 |
| 3,737,040 | 6/1973 | Brydey | 210/242 |
| 3,752,317 | 8/1973 | Lithen | 210/242 |
| 3,815,751 | 6/1974 | Pavlouc | 210/242 |
| 3,822,789 | 7/1974 | Cusafulli | 210/DIG. 25 |
| 3,823,828 | 7/1974 | Derzhavets et al. | 210/242 |
| 3,862,040 | 1/1975 | Preus et al. | 210/DIG. 25 |

*Primary Examiner*—Theodore A. Granger
*Attorney, Agent, or Firm*—George B. Qujevolk

[57] ABSTRACT

An arrangement for disposing of contaminating matter floating in a fluid. A recovery-separation tank is used with an inner water surface lower than that of the outside. The floating matter, such as oil floating on the surface of water outside the recovery-separation tank, is drawn in through an inlet of the recovery-separation tank. The floating matter and the water are separated into layers which flow into the recovery-separation tank and a drain pump discharges the water lying in the lower portion of the recovery-separation tank.

2 Claims, 22 Drawing Figures

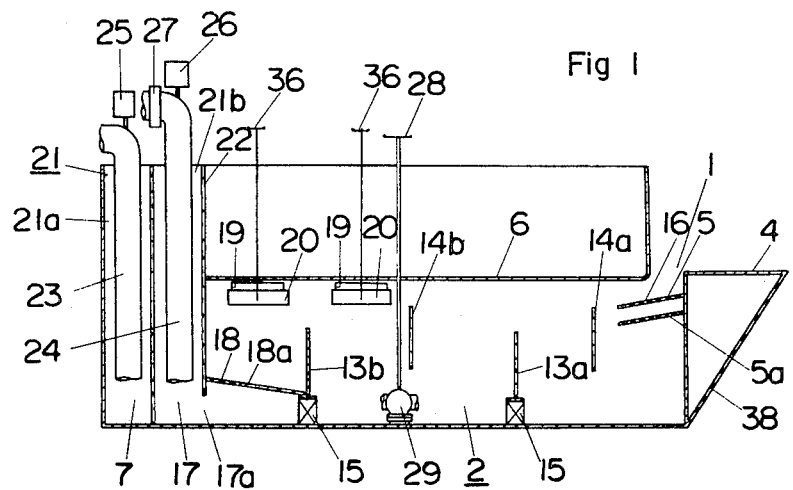
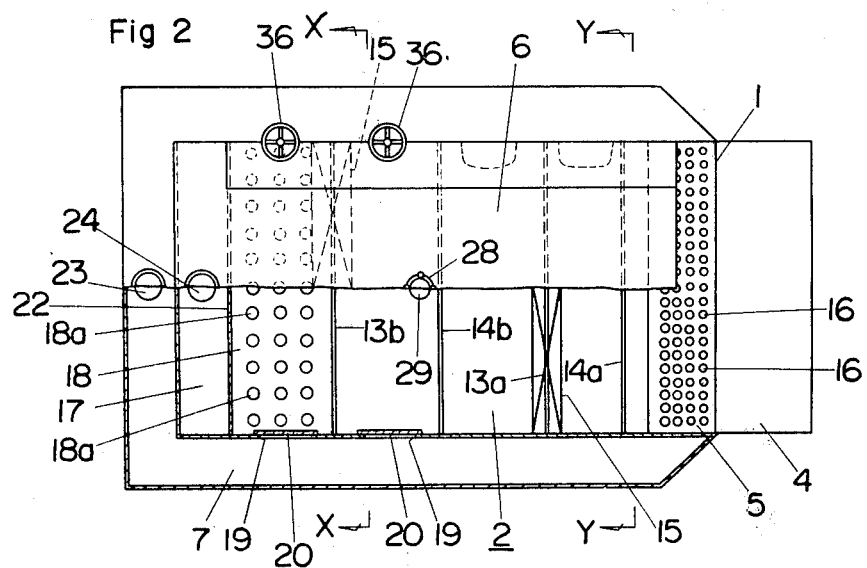
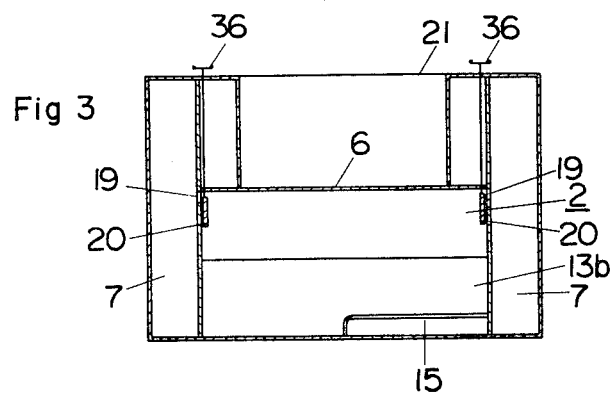

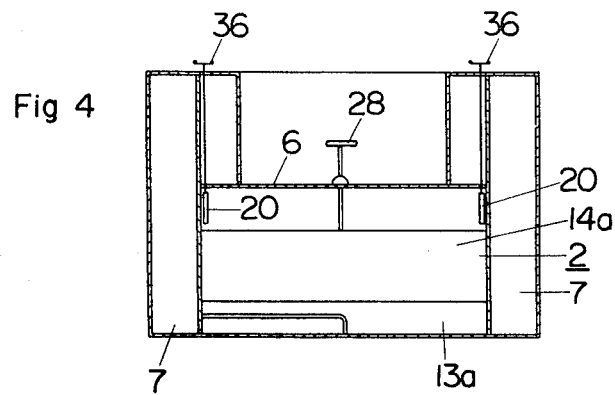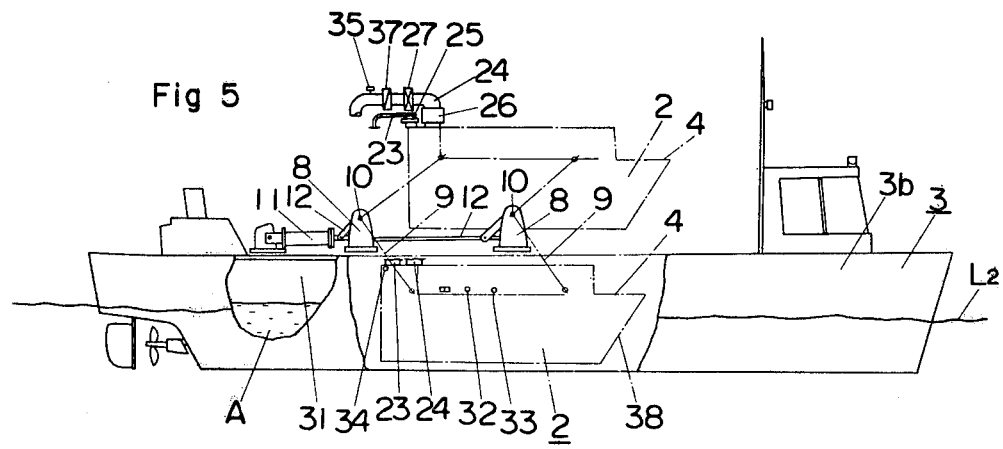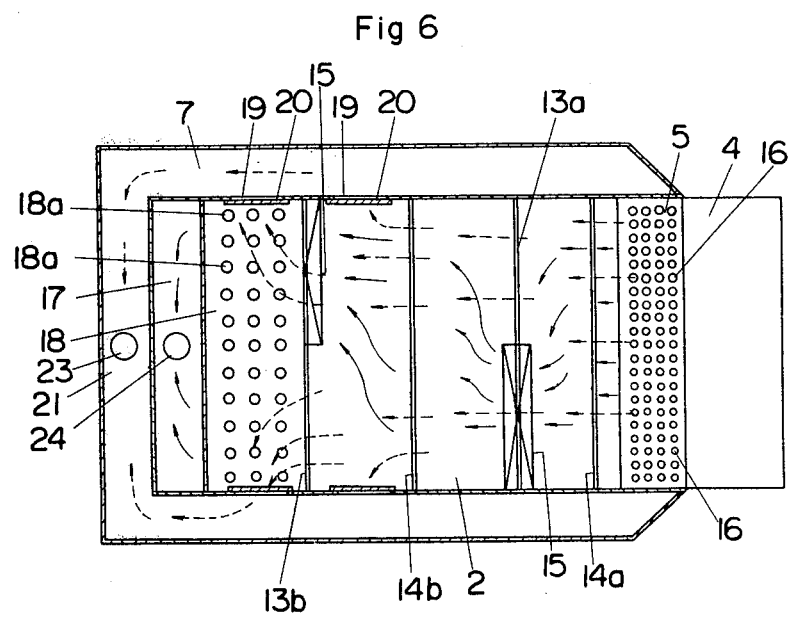

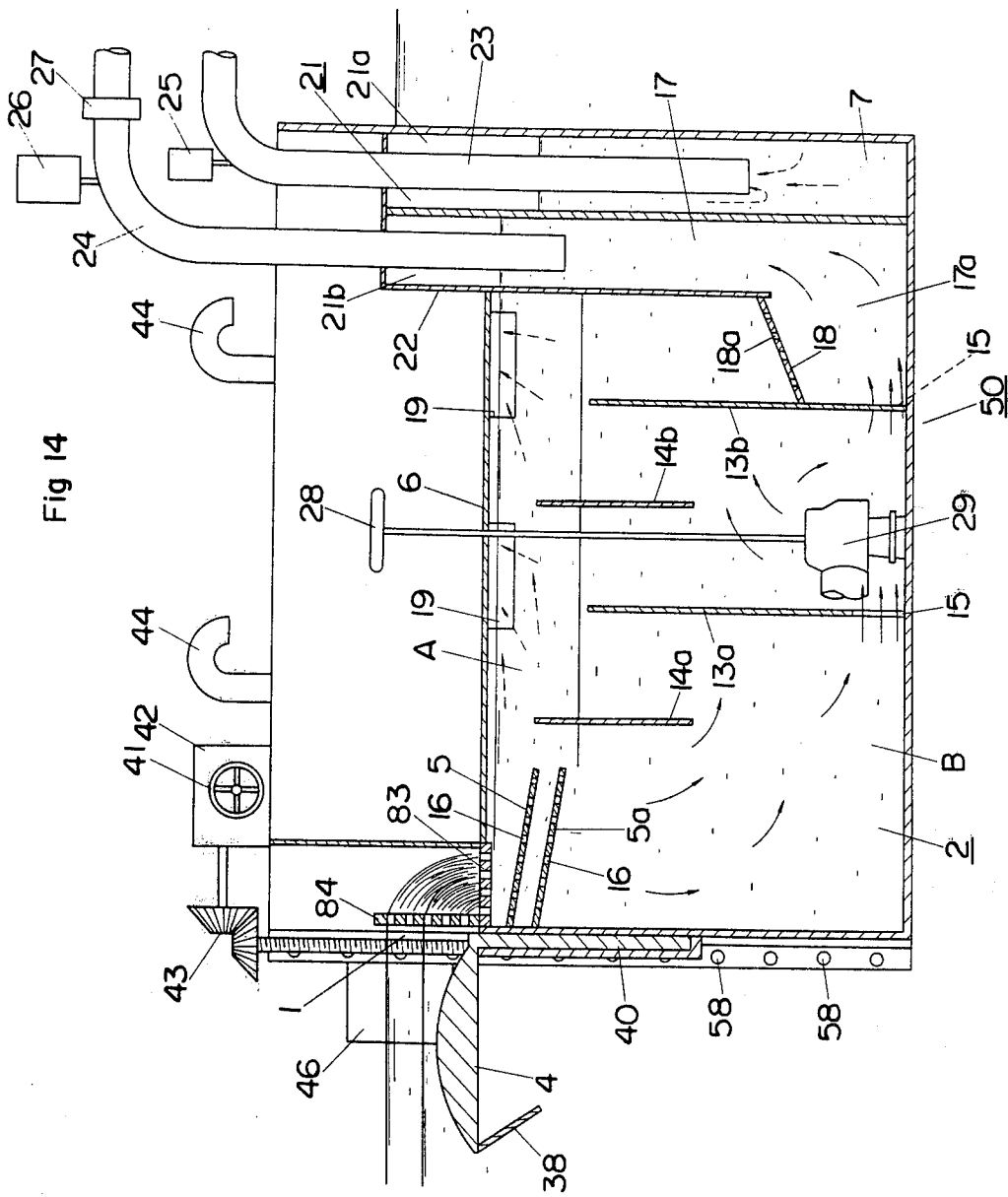

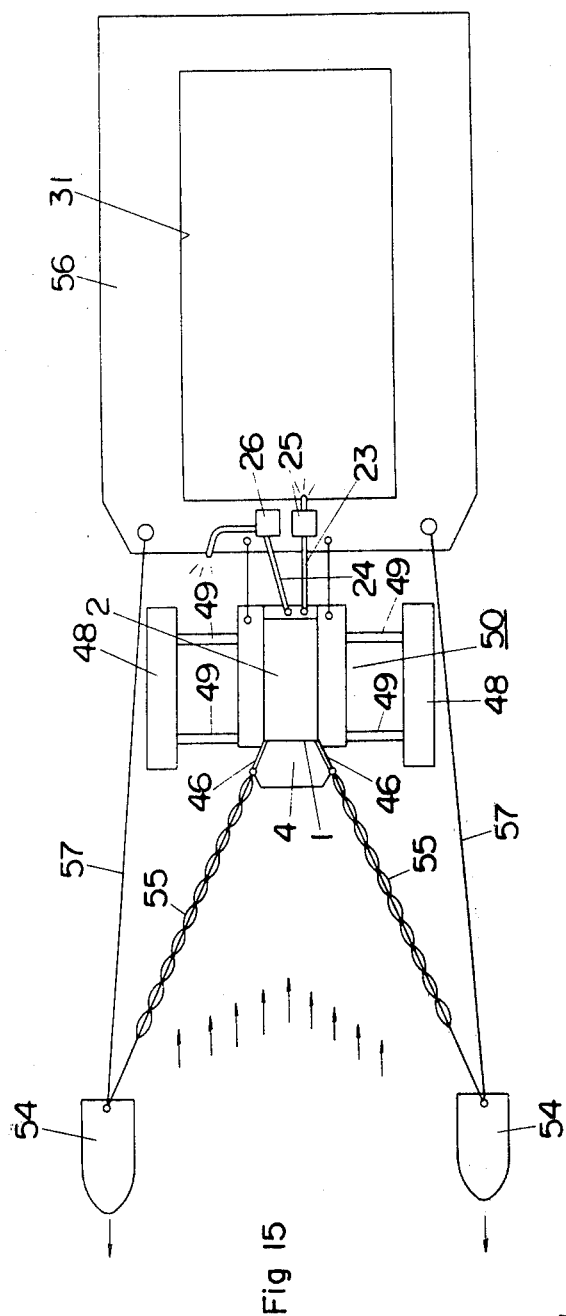
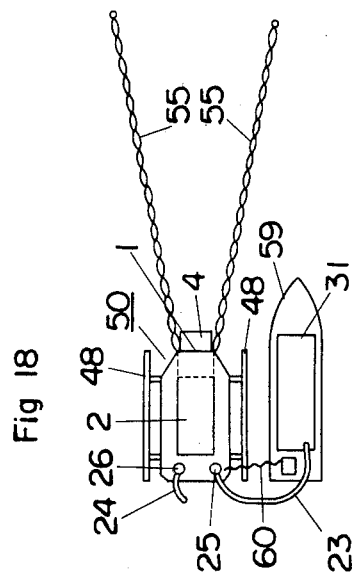
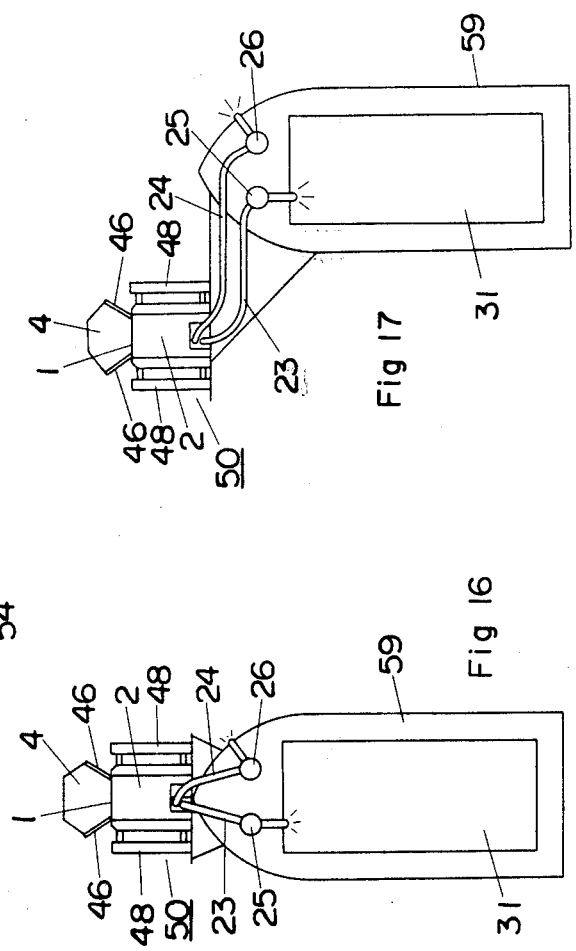

ARRANGEMENT FOR DISPOSING OF FLUID FLOATING MATTER

BACKGROUND OF THE INVENTION

The present invention relates to an arrangement for disposing of fluid floating matter such as oil floating on water.

BRIEF DESCRIPTION OF THE PRIOR ART

Several means have been proposed to dispose of floating matter on water such as oil and red tide which will cause ocean pollution and exert a harmful influence upon human life. When the floating matter is an oily matter such as discharged oils, some methods have been available for recovering these pollutants. These methods include:

(1) treating with a neutralizing agent;
(2) absorbing into an absorbent; and,
(3) pumping up the thickened layer of floating matter caused by the use of spread-preventive barrier such as an oil fence.

These methods, however, have drawbacks when implemented. As for method (1), the trouble lies in that large amounts of the neutralizing agent have to be ready for use. Also, the neutralized oils cause a secondary pollution; and as for method (2), it is difficult to rid the absorbent of the discharged oil adhering to it. Thus, this repeated use of the absorbent renders it ineffective, and the rainbow-colored membrane, due to the small amount of discharged oil, also makes it impossible to adopt this method. In carrying out method (3) with its advantage of feasibility in preventing the discharged oil on the surface from spreading, it was found that it gave rise to various kinds of difficulties in the process of removing the encircled discharged oil. The use of either a neutralizing agent or an absorbent entails the foregoing difficulties. The usual adopted method is gathering the discharged oil into a smaller area using a spread-preventive barrier, thus making the oil layer thick enough to be pumped by a special pump such as a vacuum pump and a float-saxon pump especially designed to be capable of pumping out the layers near the surface of the water. In this method the difficulty is that the water surface fluctuates with the waves occuring so that it frequently happens that the pump takes in a large amount of water that it should not, thus making it impossible for the thick-layered rainbow-colored membrane to be restored. When the floating matter is other than oil, such as red tide, method (1) and (2) to be used for oily matter are not possible to apply, and only method (3) can be applied to such a limited degree that the oil fence can only keep the red tide from spreading. There is virtually no effective means available to get rid of non-oily matter such as red tide.

SUMMARY OF THE INVENTION

Generally speaking, this invention contemplates that fluid floating matter such as red tide or discharged oil floating on water surface, e.g., floating on the ocean surface, can be removed completely. This is especially designed for a small amount of fluid floating matter spreading over a vast area such as rainbow-colored membrane.

Also, the present invention makes it possible not only to recover the fluid floating matter to be removed, but also makes it possible to remove and recover a larger amount of fluid floating matter through a continuous process.

Still another object of the present invention is that it is so designed that it gives a higher ratio of the fluid floating matter to the water flowing in through the inlet, giving higher removal and restoration efficiency, and it makes possible the removal and restoration of widely spreading fluid floating matter.

A further object of the invention is that it will present the water and floating matter being segregated from each other inside the recovery-separation tank in a better condition for treatment. Particularly, it is designed to prevent the water and floating matter from co-existing emulsified for long time periods as a result of fluid floating matter having interacted with water when the water falls through the inlet.

A further object of the present invention is that it is capable of forcing the emulsified fluid floating matter to bouy up, facilitating the segregation of the water and the fluid floating matter.

Also, the present invention is designed to restore the fluid floating matter only from upper layers so as to provide higher efficiency in restoring by drawing in as small an amount of water coming in contact with the fluid floating matter as possible.

The present invention is so designed that the water to be returned outside the recovery-separation tank will contain as little fluid floating matter as possible, so as to prevent secondary pollution of the sea and of the accidental inflow of the fluid floating matter into the recovery-separation tank when the water level is lowered.

Another important object of the present invention is that by giving the recovery-separation tank mobility, this mobility is also given to the floating matter removal operation, thus making possible on the spot operation where the floating matter is all over the water surface.

BRIEF DESCRIPTION OF THE DRAWINGS

Other objects and features of the present invention will now be described, references being made to the attached drawings in which:

FIG. 1 is a sectional side elevation showing a recovery-separation tank which has a floating matter reservoir in one of the preferred embodiments of the present invention;

FIG. 2 is a top view partly in section showing the recovery-separation tank;

FIG. 3 is a sectional view taken on line X—X in FIG. 2;

FIG. 4 is a sectional view taken on line Y—Y in FIG. 2;

FIG. 5 is a forshortened schematic view in side elevation partly in section showing a recovery-separation tank installed between the hulls of a catamaran in one of the preferred enbodiments of the invention.

FIG. 6 is a semi digrammatical top view showing the flow of the floating matter and the water.

FIG. 14 is an enlarged sectional view taken on line Z—Z in FIG. 13;

FIG. 15 is a top view showing an application according to an embodiment of the invention.

FIG. 16 through FIG. 22 are schematic representations showing applications according to preferred embodiments of the invention.

DETAILED DESCRIPTION OF THE PREFERRED EMBODIMENTS

Figure 7:
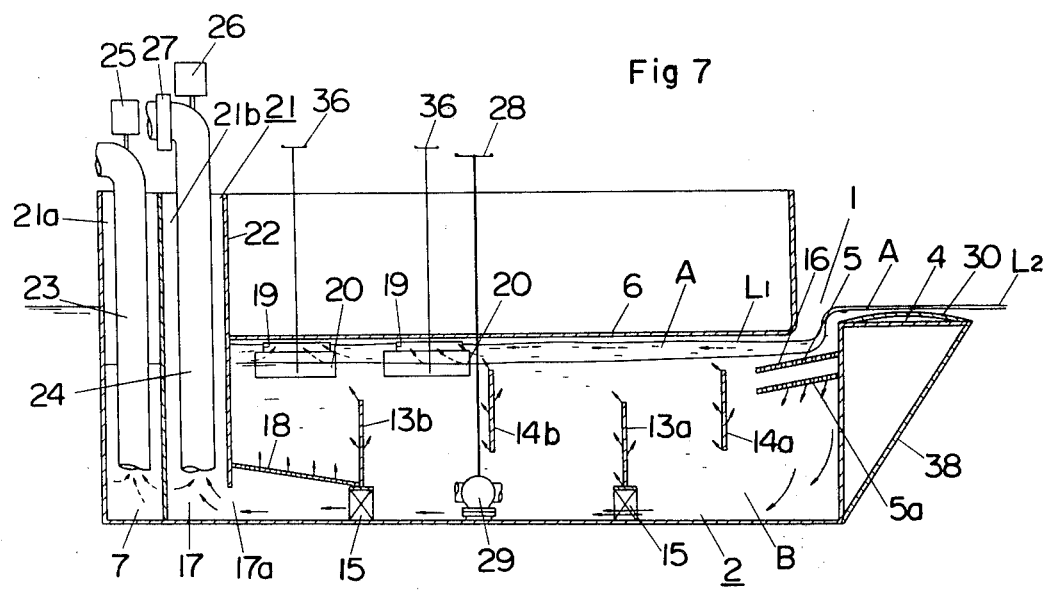
FIG. 7 is an expanded sectional view showing the flow of the floating matter and the water in the recovery-separation tank when providing an arch-like convex on the inflow board according to another embodiment of the invention.

The present invention will now be described in detail in conjunction with the accompanying drawings;

A recovery-separation tank 2 has at its front an inlet 1 from which an inflow board 4 extends forward, two anti-emulsion plates 5, 5a parallel to each other and slanting downward are located inside of inlet 1, and a grid for sweeping dust may be provided in inlet 1 when necessary. The tank 2 in one of the preferred embodiments of the invention is incorporated into a boat with a deck 6, and a floating matter reservoir 7 is provided at the rear and on each side of tank 2. Referring now to FIG. 5, tank 2 is located between the hulls 3a, 3b of a catamaran 3 and suspended from the hulls 3a, 3b by an arm 9 with one end of arm 9 connecting to the side of tank 2, the other end pivoting to a supporting member 8 on catamaran 3. Tank 2 is capable of going up and down by turning on support axle 10 of arm 9 by means of a crank mechanism 12 which operates on an oil cylinder 11. Inside tank 2 are a series of partitions 13a, 13b and baffle plates 14a, 14b with their surfaces facing perpendicularly in the inflow direction of the floating matter A, and the top end of the partitions 13a, 13b being positioned at the same height as at the lower surface of the layer of floating matter A, e.g., oil introduced into tank 2, and the top part of baffle plates 14a, 14b being higher than the top end of partitions 13a, 13b. The lower portion inside of tank 2 is divided with partitions 13a, 13b which have a flow port 15 at their lower ends; the inflow port 15 of each partition 13 being at the opposite side to that of adjacent partition 13 so that water B, e.g., sea water runs zigzag through these flow ports 15. The lower portion of the baffle plates 14a, 14b is open so as to regulate the current of the water B under the floating matter A. The arrow in a solid line in FIGS. 6 and 7 indicates the current of the water B in the lower portion of tank 2; the arrow in a broken line indicates the current of floating matter A in the upper portion of tank 2. The anti-emulsion plates 5, 5a slant downward from the inlet 1 toward the inside of tank 2, forming the intermediate layer between plates 5, 5a. Many tiny holes 16, about 1 cm in diameter, are perforated through the anti-emulsion plates 5, 5a so as to introduce the floating matter A and the water B coming in from inlet 1 in layers, thus flushing down only the water B through the tiny holes 16 into the lower portion of tank 2 and carrying the floating matter B along the anti-emulsion plates 5, 5a into the upper portion of tank 2 and preventing the floating matter from emulsifying due to impulsive stirring that occurs when the floating matter A rushes in from the surface of the water outside tank 2 in which the surface level $L_1$ of the water is lower than the surface level $L_2$ of the water outside tank 2. In this embodiment of the invention, one example is shown wherein two anti-emulsion plates 5, 5a are provided, however, only one anti-emulsion plate is enough to prevent emulsification, while many anti-emulsion plates are also effective. The upper anti-emulsion plate 5 has tiny holes 16, a little larger than those of the lower one 5a, so as to separate the floating matter A from the water B.

A water chamber 17 is installed in the rear part of tank 2 and a diaphragm 18 spans between the front wall of chamber 17 and the adjacent partition 13b with a slight slanting downwards from the lower end of the front wall to the part just above the flow port 15 of partition 13b. The diaphragm 18 has a plurality of perforations 18a, about 1 cm in diameter, so as to prevent the floating matter A from invading into chamber 17 through the water entrance 17a. A floating matter collection port 19 is provided at the upper portion of tank 2 so that the floating matter A overflows from tank 2 into the reservoir 7 through port 19 with a valve 20 and is gathered therein. An opening 21 is provided at the rear of deck 6 with the top end above deck 6 and divided into an opening 12a for removing the floating matter and an opening 21b for draining out the water, and encircled by a wall 20 so that the top end of opening 21 is above the surface level $L_2$ of the outside water. A floating matter suction pipe 23 connected to a suction pump 25 is installed in the opening 21a, and a water drainage pipe 24 which is connected to a drain pump 26, is in the opening 21b. A filter is attached on the way of the drainage pipe 24.

Referring now to FIG. 7 which shows one of the preferred embodiments of the invention, an introducing plate 30 of arc-like sections is linked to the inflow board 4 with the slope of its convex part facing in the direction of the inflow of the water, the numeral 38 indicates a counterplate. As the catamaran goes about the area that requires recovering floating matter, tank 2 goes down by driving the oil cylinder 11, at the same time opening valve 29 by turning handle 28 to take in contaminated water to a prescribed level, and on fixing tank 2 at the depth that the upper surface of inflow board 4 comes beneath the surface level $L_2$ of the outside water, the floating matter in layers begins to flow into tank 2 keeping it stratified. In this condition catamaran 3 stops or proceeds at a low speed of about 0.5 to 1.5 knots to continue the recovery operation. The floating matter together with the water flows in tank 2 in layers due to the effect of the semi-stationary state resulting from the action of the anti-emulsion plates 5, 5a which prevent the floating matter from emulsifying and from being stirred impulsively when they rush down into tank 2. Thus, the floating matter and the water B are separated into upper and lower layers. The floating mater A separated into a layer at the upper portion of tank 2 is forced to flow in the reservoir 7 through the collection port 19 and the floating matter A filled in reservoir 7 is sucked up by suction pump 25 through suction pipe 23 so as to be stored in a floating matter pool 31 provided in hulls 3a, 3b of catamaran 3. The water B occupying the lower portion of tank 2 is led to chamber 17 provided at the rear of tank 2 through flow port 15, 15 and then sucked up by drain pump 26 through drainage pipe 24 and the filter 27, and after that the water B is discharged from tank 2. The recovery-separation tank 2 is also equipped with a boundary detector 32 which discovers the boundary between the water and the floating matter, a level detector 33 which reads the level of the water on the surface of the floating matter, a level detector 34 which detects the level of the surface of the floating matter inside the reservoir 7, and an oil densitometer 35 in the drain pipe 26. The output of detector 33 controls the drain pump 26 so as to keep the surface level of the water within a specified range and at the same time the output of detector 32, which is placed at upper and lower positions in order to read the upper and lower limits of the boundary, open the valve 20 so as to channel the floating matter A into the reservoir 7 through the collection port 19 when the thickness of the layer of the floating matter A becomes greater than a certain value, e.g., 100 mm and closes valve 20 when the layer of the floating matter A becomes less than a certain value, e.g., 50 mm. In this operation, valve 20 can be operated by handle 36, and the output of detector 33 controls the opening and closing operation of outlet valve 37 so as to maintain the surface level (the level of the upper surface of the layer of floating matter A) within a prescribed range, while the output of detector 34 controls the power of suction pump 25, keeping the level of floating matter A in tank 2 within a specified range. Thus, suction pump 25 operates when the level of floating matter A is greater than 1,100 mm and stops when less than 800 mm, reducing the fall of floating matter A from the collection port 19 as much as possible. In conducting the recovery of floating oil on the surface of water, when the oil densitometer 35 reads that the concentration of oil is above a predetermined value, the oil cylinder 11 works to move down tank 2 so as to draw in a greater amount of water through inlet 1, lowering the oil concentration, and after appropriately processing the output signals of the detectors 32, 33 and 34, which monitor the state of recovery and separation, the position of the lower edge of inlet 1 (or that of the convex of inflow board 4) against the water surface level $L_2$ outside tank 2 is appropriately varied.

In the embodiment described, the output signals from each detector are processed to alter the ratio between the amount of water and floating matter which flow in through inlet 1 so that the floating matter can be recovered in higher efficiency.

Referring to the results of experiments conducted using models, the following points were investigated: (1) suction capacity; (2) the amount of oil going down under the tank just before it is to enter, and the amount of oil that fails to enter; (3) the distribution of the waterflow inside the tank; (4) the distribution of the waterflow under the influence of the oil on the surface immediately before it enters; and finally, (5) recovery efficiency.

The conditions under which these indoor experiments were conducted are listed, particular care being taken with regard to the Reynolds number.

EXAMPLE

The recovery-separation tank used is 10 meters long, 1.5 meters wide, 0.5 meters deep, and made with an iron-frame canvas; the catamaran is 1.9 meters long by 0.8 meters to a scale of 1 to 10 and made of wood; the floating matter reservoir included in the tank is 0.45 meters long by 0.3 meters made of plastic and also to a scale of 1 to 10; and the drain pump has the pumping capacity of 12 liters per minute at its maximum efficiency; and the suction pump has the pumping capacity of 20 liters per minute. The 1 to 10 scale is adopted for the height of wave to be produced by stirring the water with a board near the front edge of the experimental tank. In regard to the oil used as a model for the floating matter, a calculation was made from the whole area of the experimental tank (8 m × 1.5 m) to determine the amount to be deposited so that the oil membrane to be formed may be 1/10 as thick as it might be under real conditions. Next, the speed of the catamaran was set to run to one tenth of true speed, which was done by winding a rope around the turning drum installed in front of the tank and pulling the rope tied to the model catamaran in such a way that the model could be drawn at a constant speed. The temperature at the time of the experiment was between 9° and 10° Centigrade, and the water used was clear water with the temperature kept at 7° Centigrade.

The oil used as the floating matter was A-crude oil with the temperature of 7° Centigrade and the specific weight of 0.8386 immiscible with water, kinematic viscosity of 2.38 Cst, viscosity of 31.7 Rw, pour point of 12.9, flash point of 85, less than 0.1% of water, 0.01% ash content, 0.81% sulfur content, 0.07% residual carbon, and 105 cal. of heat capacity.

First, the result gained as to suction capacity will be discussed. This experiment, with a small amount of oil and saw dust cast in front of the inlet of the tank, was conducted while the catamaran, that is to say, the recovery-separation tank, was kept stationary. The drain pumps used were the ones with 12 liters per minute capacity (the real equivalent of which is 720 M/H) and the one with 5 liters per minute capacity (the real equivalent of which is 300 M/H). The way the experiment was carried out is illustrated in FIG. 7 in which an arch-shaped brass board was attached so as to create a convex member and a sloping surface in the direction of inflow. Other experiments were carried out only with the inflow board attached. Therefore, the results obtained from the first experiment were measured from the time that the floating matter such as oil or dust took to go down to reach the inlet and the calculated suction capacity.

Table 1 shows the results of the experiment on the suction capacity. Also indicated in the results shown in Table 1 is that the floating matter was being suctioned into the inlet at the speed of more than 1 cm per second, and gave good results for the floating matter being suctioned and recovered, especially when the arch-shaped introducing plate was installed on the inflow board. A great increase in the suction rate was observed with regard to the material used for the inflow board. The introducing plate of brass or stainless steel is better than plastic. It is necessary to use a material with good corrosion resistance, erosion resistance and with a small friction factor.

TABLE I

| Capacity of Drain Pump | Floating Matter | Time Required | Remarks |
| --- | --- | --- | --- |
| 12 liters/min. | A-crude oil | 1 min. 46 sec. | flow speed, 0.014 m/sec. |
| 5 liters/min. | A-crude oil | 2 min. 13 sec. | flow speed, 0.011 m/sec. |
| 12 liters/min. | saw dust | 1 min. 43 sec. | |
| 5 liters/min. | saw dust | 2 min. 10 sec. | |
| | | | When attached introducing plate which is arch-shaped in |

TABLE I-continued

| Capacity of Drain Pump | Floating Matter | Time Required | Remarks |
|---|---|---|---|
| 5 liters/min. | saw dust | 1 min. 12 sec. | section |

The next experiment relates to the tendency of the oil to go down under the tank immediately before its entry into the tank or its tendency to be diverted so as to miss the inlet. This experiment was done in such a way that it was possible to see if the floating matter such as oil was flowing along the oblique counter plate set under the front part of the tank and if the floating matter was diverted and drifting off to both sides of the catamaran. The height of the waves in the experimental tank was set at 3 cm (corresponding equivalent of which is 30 cm), and with a large amount of saw dust cast in; the speed of each of the two hulls was set respectively at 0 m/sec. and 0.026 m/sec. (the corresponding equivalent of which is 0.5 knots), 0.051 m/sec. (the corresponding equivalent of which is 1 knot), 0.26 m/sec. (the corresponding equivalent of which is 5 knots), and 0.51 m/sec. (the corresponding equivalent of which is 10 knots). It was carried out with the use of the drain pump for water which had the capacity of 5 liters per minute. None of these experiments showed any diversion or going down of the water.

Figure 8:
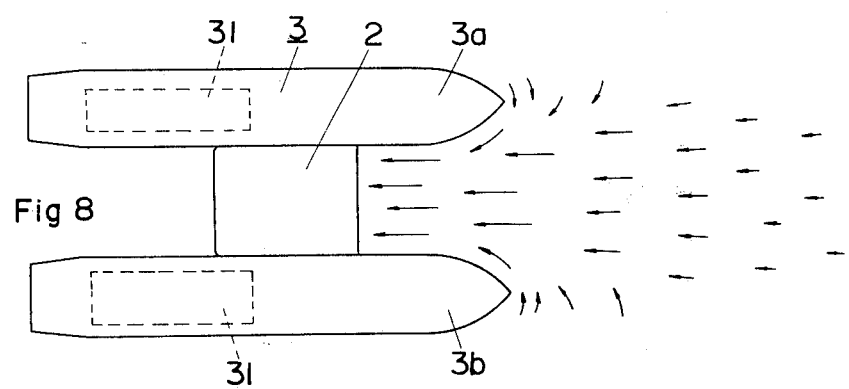
FIG. 8 is a reduced schematic plan view showing the flow near the inlet of the recovery-separation tank.

FIG. 7 shows the distribution of the flow of water as well as floating matter in experiment (3). It is what was observed with 10 liters minimum capacity (the corresponding equivalent of which is 600 M/H) of drain pump going, and with the help of several strings attached to the various parts of the tank, to see the distribution of the flow; the arrows in a solid line show the direction of water flow and the arrows in a broken line show the floating matter. Thus, in this experiment, the deflected current caused by the two partitions and their flow port is so strong that the lower port sees both flows. And, as is obvious from the illustration, two partitions and the baffle plates with the flowing direction upward are capable of giving the residual floating matter in the water a bouyant thrust. Moreover, all directions of flow above the diaphragm in this invention are upward so that even if the flowing matter accidentally flows through the diaphragm into the water chamber there will not be any floating matter in the drained water. The distribution of the flow in front of the inlet in experiment (4) is as shown in FIG. 8. This indicates that the flow is most rapid near the bows of the catamaran and it was observed that there was considerable suction through the reflecting gunwales of each bow of the catamaran, and it was discovered that it would gain a higher speed of flow if a member was put convex on the inflow board to form an introducing bulge.

Figure 9:
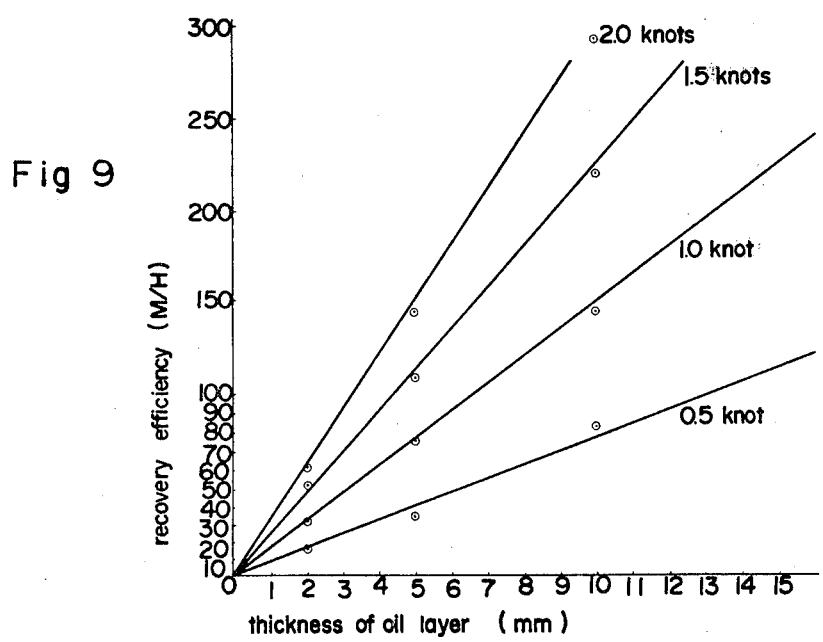
FIG. 9 is a graphic representation showing recovery-efficiency vs. thickness of oil layer, using the speed of a vessel as a perimeter.
Figure 10:
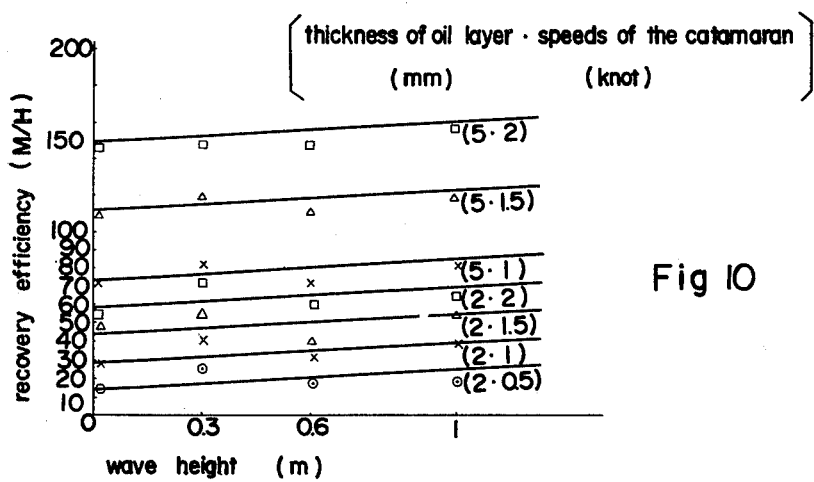
FIG. 10 is a graphic representation showing recovery-efficiency vs. wave height, using the vessel speed as a perimeter.

Table 2 shows the results obtained in experiment (5). The figures in parentheses represent those converted into actual figures. Also, FIG. 9 illustrates recovery-efficiency plotted against the oil layer thickness. FIG. 10 illustrates recovery-efficiency against the height of the waves. In FIGS. 9 and 10 the figures used are all converted into actual ones. Therefore, these experiments prove that an increase in the speed of the catamaran or the oil-layer thickness would bring the expected result of having an increase in recovery-efficiency. Also, the higher the waves, the better recovery-efficiency was obtained, which is a good characteristic.

This can be interpreted as good recovery-efficiency due to increase in speed resulting from the alternative action that the floating matter piled up on the inflow board, at the time of wave rise, flows into the tank following wave shrinking. The exceptional case was observed when the height of the waves read 60 cm. Interference among the waves inside the tank took place resulting in less efficiency in the recovery. Thus, high efficiency is obtained in boosting the capacity of the drain pump, as well as when the vessel goes at a higher speed, or the waves are high. The experiments shown in FIGS. 9 and 10 were performed with the use of a drain pump capable of draining 5 liters per minute (the corresponding equivalent of which is 300 M/H) which was kept constant, and the amount recovered was not the one actually recovered, but the corresponding amount calculated back based on the gross amount of the floating matter (crude oil) and the thickness of the layer which the floating matter inside the tank formed.

| test | No. | 1 | 2 | 3 | 4 |
|---|---|---|---|---|---|
| thickness of oil layer | mm (mm) | 0.2 (2) | 0.2 (2) | 0.2 (2) | 0.2 (2) |
| height of wave | cm (cm) | 0 | 0 | 0 | 0 |
| time for recovery | min. sec. | 5'13" | 2'42" | 1'46" | 1'20" |
| speeds of the catamaran | knots | 0.05 (0.5) | 0.098 (0.98) | 0.145 (1.45) | 0.198 (1.98) |
| amounts of recovery | ls (M³) | 1.44 (1.44) | 1.38 (1.38) | 1.38 (1.38) | 1.30 (1.30) |
| recovery efficiency | l/min (Ms/H) | 0.277 (16.6) | 0.51 (30.6) | 0.78 (46.8) | 0.97 (58.3) |

| test | No. | 5 | 6 | 7 | 8 | 9 |
|---|---|---|---|---|---|---|
| thickness of oil layer | mm (mm) | 0.2 (2) | 0.2 (2) | 0.2 (2) | 0.2 (2) | 0.2 (2) |
| height of wave | cm (cm) | 3 (30) | 3 (30) | 3 (30) | 3 (30) | 6 (60) |
| time for recovery | min. sec. | 5'10" | 2'30" | 1'44" | 1'19" | 5'13" |
| speeds of the catamaran | knots | 0.06 (0.6) | 0.102 (1.02) | 0.15 (1.5) | 0.199 (1.99s) | 0.05 (0.5) |
| amounts of recovery | l (M³) | 2.39 (2.39) | 1.77 (1.77) | 1.69 (1.69) | 1.58 (1.58) | 1.61 (1.61) |
| recovery efficiency | l/min (M³/H) | 0.46 (27.8) | 0.71 (42.5) | 0.98 (58.5) | 1.20 (72.2) | 0.31 (18.3) |

| test | No. | 10 | 11 | 12 | 13 | 14 |
|---|---|---|---|---|---|---|
| thickness of oil layer | mm (mm) | 0.2 (2) | 0.2 (2) | 0.2 (2) | 0.2 (2) | 0.2 (2) |
| height of wave | cm (cm) | 6 (60) | 6 (60) | 6 (60) | 10 (100) | 10 (100) |
| time for recovery | min. sec. | 2'35" | 1'46" | 1'18" | 5'15" | 2'30" |
| speeds of the catamaran | knots | 0.100 (1.00) | 0.145 (1.45) | 0.200 (2.00) | 0.048 (0.48) | 0.102 (1.02) |
| amounts of recovery | l (M³) | 1.24 (1.24) | 1.24 (1.24) | 1.38 (1.38) | 2.49 (2.49) | 1.75 (1.75) |
| recovery efficiency | l/min (M³/H) | 0.48 (28.9) | 0.70 (42.1) | 1.06 (63.8) | 0.475 (28.3) | 0.70 (42.1) |

| Test | No. | 15 | 16 | 17 | 18 | 19 |
|---|---|---|---|---|---|---|
| thickness of oil layer | mm (mm) | 0.2 (2) | 0.2 (2) | 0.5 (5) | 0.5 (5) | 0.5 (5) |
| height of wave | cm (cm) | 10 (100) | 10 (100) | 0 | 0 | 0 |
| time for recovery | min. sec. | 1'44" | 1'20" | 5'14" | 2'35" | 1'46" |
| speeds of the catamaran | knots | 0.200 (2.00) | 0.198 (1.98) | 0.049 (0.49) | 0.10 (1.0) | 0.145 (1.45) |
| amounts of recovery | l (M³) | 1.57 (1.57) | 1.5 (1.5) | 3.22 (3.22) | 3.11 (3.11) | 3.24 (3.24) |
| recovery efficiency | l/min (M³/H) | 0.90 (54.5) | 1.14 (68.1) | 0.616 (37) | 1.21 (72.3) | 1.83 (110) |

| Test | No. | 20 | 21 | 22 | 23 | 24 |
|---|---|---|---|---|---|---|
| thickness of oil layer | mm (mm) | 0.5 (5) | 0.5 (5) | 0.5 (5) | 0.5 (5) | 0.5 (5) |
| height of wave | cm (cm) | 0 | 3 (30) | 3 (30) | 3 (30) | 3 (30) |
| time for recovery | min. sec. | 1'19" | 5'13" | 2'24" | 1'40" | 1'18" |
| speeds of the catamaran | knots | 0.199 (1.99) | 0.05 (0.5) | 0.11 (1.1) | 0.152 (1.52) | 0.200 (2.00) |
| amounts of | l | 3.08 | 3.85 | 3.30 | 3.28 | 3.25 |

-continued

| | | | | | | |
|---|---|---|---|---|---|---|
| recovery | (M³) | (3.08) | (3.85) | (3.30) | (3.28) | (3.25) |
| recovery | l/min | 2.40 | 0.74 | 1.38 | 1.97 | 2.50 |
| efficiency | (M³/H) | (146) | (44.3) | (82.5) | (118) | (150) |

| Test | No. | 25 | 26 | 27 | 28 | 29 |
|---|---|---|---|---|---|---|
| thickness of | mm | 0.5 | 0.5 | 0.5 | 0.5 | 0.5 |
| oil layer | (mm) | (5) | (5) | (5) | (5) | (5) |
| height of wave | cm | 6 | 6 | 6 | 6 | 10 |
| | (cm) | (60) | (60) | (60) | (60) | (100) |
| time for | min. | 5'15" | 2'30" | 1'44" | 1'20" | 5'15" |
| recovery | sec. | | | | | |
| speeds of the | knots | 0.048 | 0.102 | 0.15 | 0.198 | 0.048 |
| catamaran | | (0.48) | (1.02) | (1.5) | (1.98) | (0.48) |
| amounts of | l | 3.63 | 3.04 | 3.24 | 3.28 | 4.16 |
| recovery | (M³) | (3.63) | (3.04) | (3.24) | (3.28) | (4.16) |
| recovery | l/min | 0.692 | 1.22 | 1.87 | 2.46 | 0.79 |
| efficiency | (M³/H) | (41.5) | (73) | (112.3) | (147.5) | (47.6) |

| Test | No. | 30 | 31 | 32 | 33 | 34 |
|---|---|---|---|---|---|---|
| thickness of | mm | 0.5 | 0.5 | 0.5 | 1 | 1 |
| oil layer | (mm) | (5) | (5) | (5) | (10) | (10) |
| height of wave | cm | 10 | 10 | 10 | 0 | 0 |
| | (cm) | (100) | (100) | (100) | | |
| time for | min. | 2'38" | 1'45" | 1'18" | 5'13" | 2'30" |
| recovery | sec. | | | | | |
| speeds of the | knots | 0.100 | 0.146 | 0.200 | 0.05 | 0.102 |
| catamaran | | (1.00) | (1.46) | (2.00) | (0.5) | (1.02) |
| amounts | l | 3.57 | 3.48 | 3.41 | 6.78 | 6.08 |
| of recovery | (M³) | (3.57) | (3.48) | (3.41) | (6.78) | (6.06) |
| recovery | l/min | 1.38 | 1.99 | 2.63 | 1.30 | 2.43 |
| efficiency | (M³/H) | (83) | (119.5) | (157.5) | (78) | (145.5) |

Figure 11:
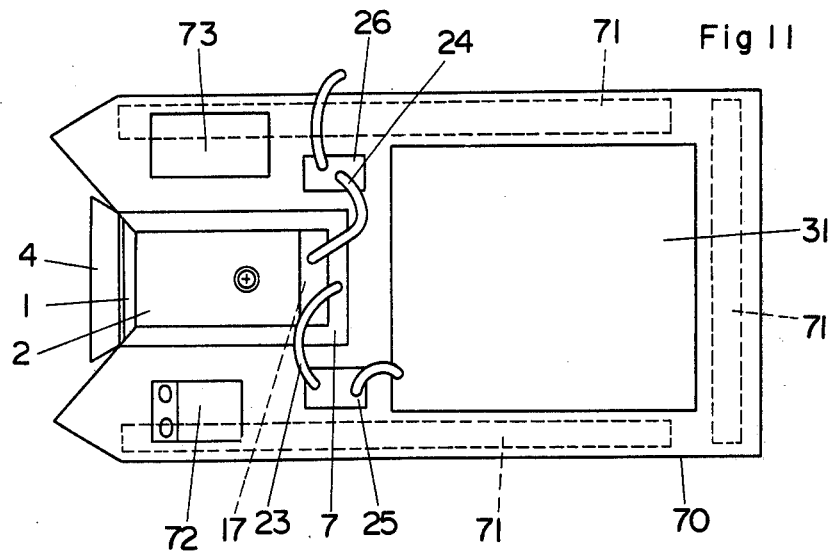
FIG. 11 is a reduced plan view according to a further embodiment of the invention in which a recovery-separation tank is installed in a barge.

FIG. 11 shows an example of another embodiment of the invention wherein the recovery-separation tank 2 is incorporated into a barge 70 that has a floating matter storing pool 31, with the inlet of tank 2 being located at the middle of barge 70, and the suction pump 25 installed on barge 70 transfers the floating matter from tank 2 to the pool 31, while the drain pump 26 installed on barge 70 drains out water occupying water chamber 17.

Figure 12:
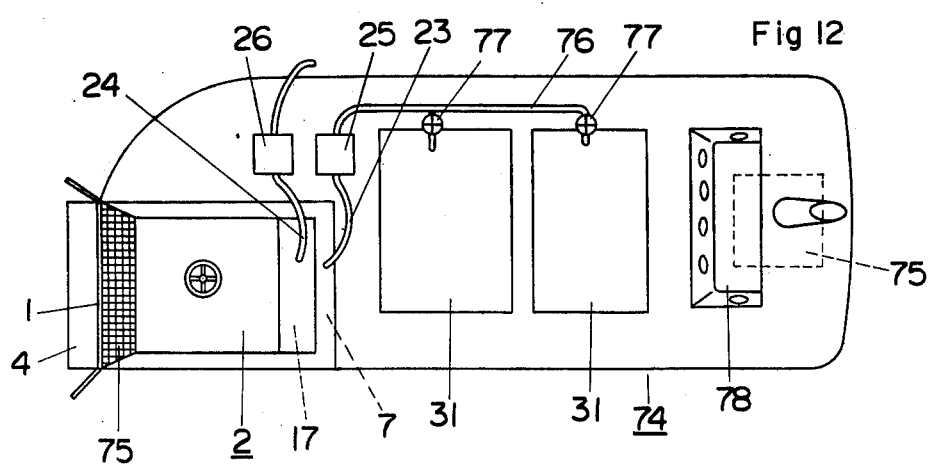
FIG. 12 is a reduced top view according to one of the embodiments of the invention in which the recovery-separation tank is installed in a small power boat.

This embodiment differs from the aforementioned embodiment in fixing tank 2 to barge 70, however, controlling the amounts of feeding water with a ballast tank 71 enables the draught of barge 70 to vary, thus lifting and dropping the inlet 1 against the level of the water outside of tank 2. In FIG. 11 there are also shown a bridge 72 and an engine room 73. Referring now to FIG. 12, there is shown a further embodiment of the invention wherein the recovery-separation tank 2 is provided in the cutaway portion on the forward left side of a relatively small power boat 74 which has the floating matter storing pool 31. The floating matter to be transferred from reservoir 7 is selectively gathered through a shifting pipe 76 into pool 31 by means of valve 77. This boat 74 is also provided with a bridge 78 and a chimney 79 for discharging the exhaust gas from engine 75.

In addition, tank 2 shown in FIG. 12 may be so constructed as to rise and fall from boat 74 as in the case described in the embodiment shown in FIG. 5 or boat 74 may be so constructed as to alter the draught as in the embodiment shown in FIG. 11.

Figure 13:
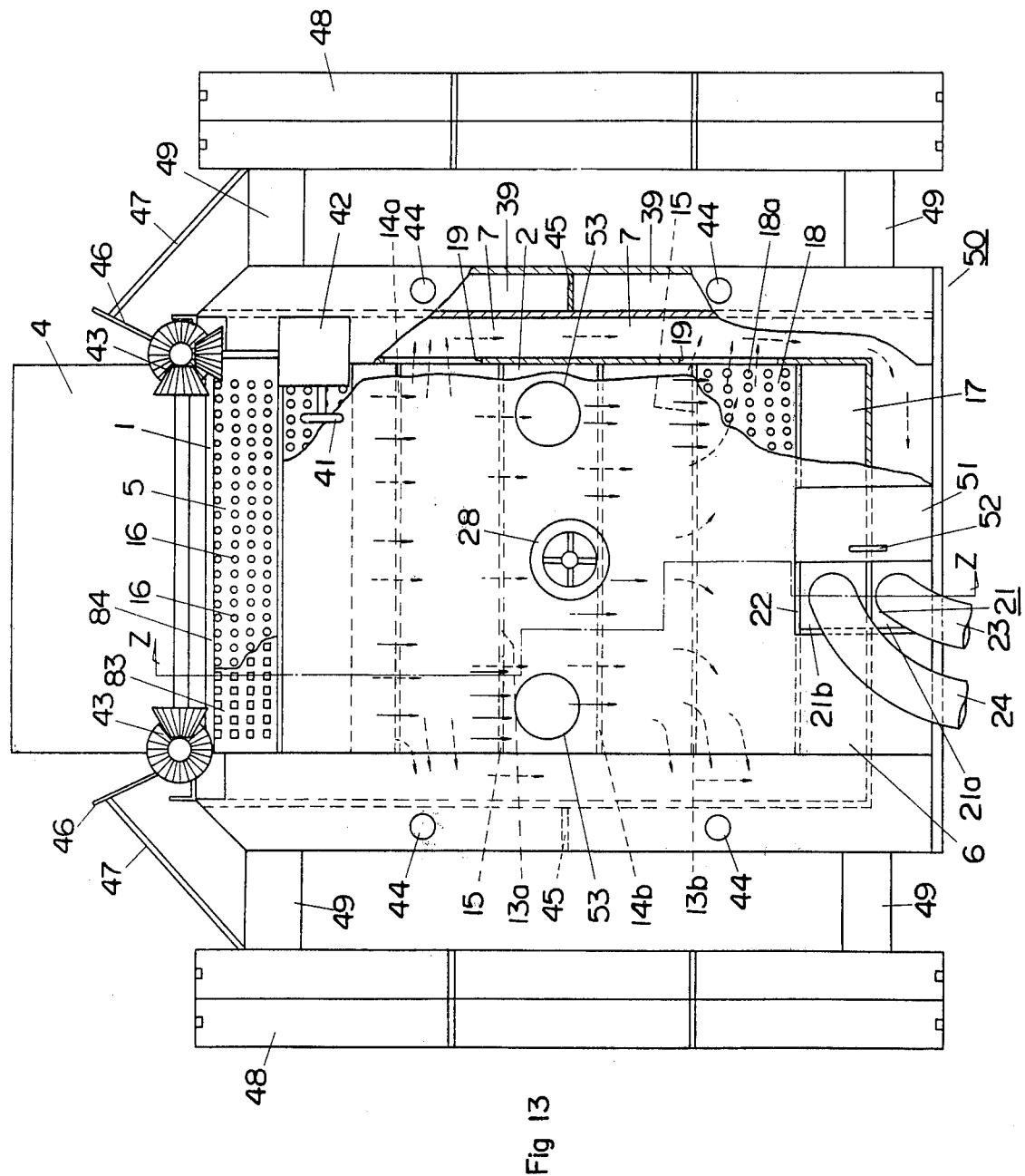
FIG. 13 is an enlarged top view partly in section showing a recovery-separation tank according to one of the embodiments of the invention in which the recovery-separation tank itself forms a recovery barge.

FIGS. 13 and 14 show one of the preferred embodiments of the invention in which tank 2, reservoir 7 and a bouyancy chamber 39 are incorporated into a recovery barge 50 so that tank 2 itself can float; an arch-shaped convex in section is provided on the upper surface of the inflow board 4 extending forward from the upper end of an elevator 40 which is capable of going up and down with the result that the inflow board 4 united with the elevator 40 can go up and down by turning handle 41 coupled to a reduction gear 42, so as to drive the elevation 40 and the inflow board 4 up and down. In addition to this manual operation, the use of a power source such as an electric motor which enables the elevation 40 and the inflow board 4 to rise and fall may be used. In this case, the motor may be controlled by the output signal of detectors 32, 33, and 34, the densitometer 35, and the like. In FIGS. 13 and 14 there are also shown a duct 44, a parting strip 45 dividing the inside bouyancy chamber 39, an entrance board 46 supported by a prop 47, and an anti-rolling member 48 connected by a leg 49 detachably mounted to each side of the recovery barge 50. Unfolding lid 51 with handle 52 makes the openings 21a, 21b wide enough to install an extra pipe and pump, adding to the suction pipe 23 and the drainage pipe 24. Lattice plates 83, 84 are provided at the front of the deck 6 so as to get rid of dust and drifting wood coming from deck 6, and a manhole 53 is provided in the middle of tank 2 through deck 6. Other arrangements are distributed in the same way as described in the former embodiment illustrated in FIG. 1 through FIG. 4. In the above mentioned embodiment the elevation 40 is also used to shut off inlet 1 entirely for preventing the inflow of water and floating matter. Referring now to FIG. 15, two tug boats 54, 54 tow the recovery skiff 50 by means of oil fences and tow a container 56 which is linked with tug boats 54, 54 by wires 57, 57. The suction pump 25, for suctioning up the floating matter, and the drain pump 26 for draining out the water, are installed in the container 56, and also the floating matter pool 31 is built inside container 56.

The oil fences 55, 55 fan out from the recovery barge 50 toward the tug boats 54, 54 with the rear ends in connecting holes 58 on the forward sides of the recovery barge 50.

FIG. 16 and 17 show one of the embodiments of the invention in which the recovery barge 50 is driven by a self-propelling container 59 which has the floating matter pool 31 along with suction pump 25 and drain pump 26.

Figure 19:
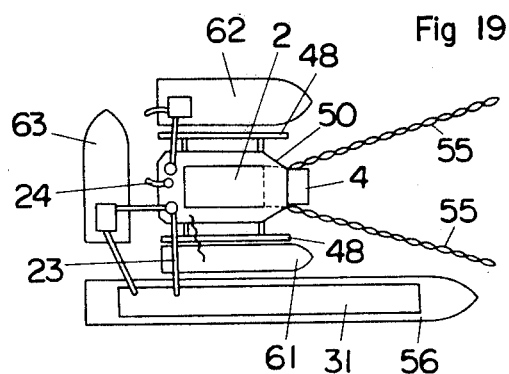

In FIGS. 18 and 19, the recovery barge 50 is stationed with an anchor at the pivot of the oil fences fanning out forward and is supplied with power by means of an electric power line 60 from an electric source equipped in a small self-propelling container 59, so as to gather the floating matter into pool 31 through suction pipe 23 (shown in FIG. 18). Or, the recovery barge 50 is supplied with power from an electric power vessel 61 so as to gather the floating matter through suction pipe 23 by means of suction pump 25 and drain pump 26 in the recovery barge 50 itself. The rerecovery barge 50 is connected to a water container 62 for storing water discharged and a floating matter container 63 for storing the floating matter removed. This enables the recovery barge 50 to recover a great amount of floating matter due to the increase in ability to drain out the water and the floating matter, (shown in FIG. 19). Therefore, the use of this arrangement results in a continuous recovery operation because container 56 can be substituted by another container 56 when pool 31 of the former one becomes full of floating matter.

Figure 20:
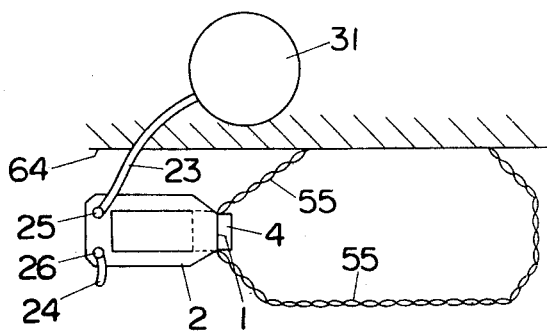
Figure 21:
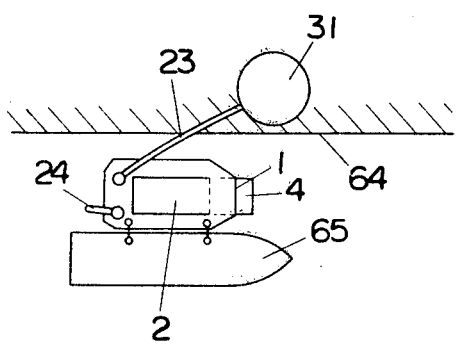

In FIG. 20 the recovery barge 50, attached to a small power boat 65, is located near a shore 64 together with oil fences 55, 55 so as to prevent a secondary pollution. In FIG. 21 the recovery barge 50 is stationed or moved about along shore 64 in order to perform a recovery operation. In these cases (shown in FIGS. 20 and 21), the suction pipe 23 may be connected to the floating matter pool 31 which is installed on the ground, thus resulting in high recovery capacity.

Figure 22:
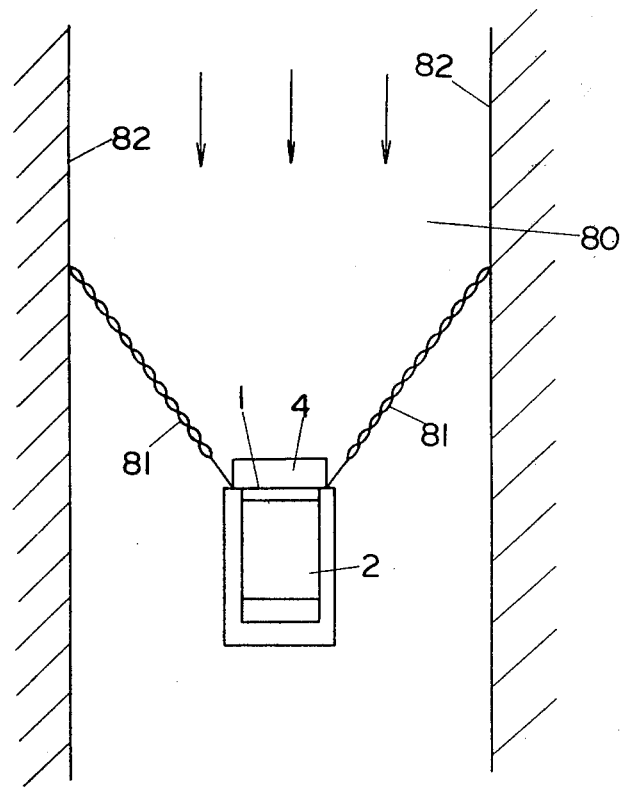

In FIG. 22, tank 2 is located between shore 82 of a river or canal with the front facing toward upstream. Oil fences 81 span inlet 1 of tank 2 to each shore 82 so as to catch the floating matter on the water. Also, tank 2 may be installed on the bottom, or at a floodgate, on the river or the canal.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

I claim:

1. An arrangement for disposing of floating matter in a body of water comprising:
    (a) a vessel which can float;
    (b) a recovery-separation tank (2) in said vessel with a surface lower than that of the outside water;
    (c) inlet means (1) at the front of the recoveryseparation recovery-separation for drawing in floating matter such as oil floating on the surface of the water outside, said inlet (1) leading to the recovery-separation tank (2);
    (d) anti-emulsion plate means (5, 5a) extending from below the inlet means (1) downwardly into the recovery-separation tank, said anti-emulsion plate having many tiny holes so as to run through the water in the direction of thickness thereof and flow floating matter along the surface thereof.
    (e) a water chamger (17) at the rear of the recovery-separation tank (2) for storing the water running the lower portion of the recovery-separation tank (2) through a water entrance opened at the lower part of the water chamber;
    (f) floating matter reservoir (7) adjacent to the recovery-separation tank (2) for storing the floating matter overflowing therefrom;
    (g) drain pump means which discharges the water out of the water chamber;
    (h) suction pump means which removes the floating matter out of the floating matter reservoir;
    (i) vertical plate travel path defining means for separating the floating matter and the water into layers, said vertical plate defining a quiescent region under the layer of floating matter, a lower elongated travel path and an upper shorter path so as to elongate the flow path of the water running in the lower portion of the recovery-separation tank to said drain pump and shortening the flow path of the floating matter to said floating matter reservoir maintaining a quiescent region therebetween, said travel path defining means including a plurality of vertical baffle plates connected to the bottom of said recovery-separation tank but spaced above the bottom of said tank and so interrelated between said inlet means (1) at the one end of said tank and said storage water chamber (17) and the floating matter reservoir (7) for separated fractions at the other end of said tank as to cause a vertical zig-zag flow through said tank.

2. An arrangement according to claim 1 wherein a plurality of anti-emulsion plates (5, 5a) are in layers up and down, said plates having small apertures, the small apertures of a lower anti-emulsion plate being smaller than those of an upper one.

* * * * *

UNITED STATES PATENT AND TRADEMARK OFFICE
CERTIFICATE OF CORRECTION

PATENT NO. : 4,119,541
DATED : October 10, 1978
INVENTOR(S) : Shigetoshi Makaya

It is certified that error appears in the above-identified patent and that said Letters Patent are hereby corrected as shown below:

Column 12, line 27, "vertical" should read -- horizontal --.

Signed and Sealed this

Twenty-fifth Day of March 1980

[SEAL]

Attest:

SIDNEY A. DIAMOND

Attesting Officer

Commissioner of Patents and Trademarks